(No Model.)

S. B. MINNICH.
COUNTERSINK TOOL.

No. 532,472.     Patented Jan. 15, 1895.

Witnesses:
Saml. D. Stauffer.
Howard B. Stauffer.

Inventor:
Simon B. Minnich,
By Dan'l H. Herr,
Attorney.

United States Patent Office.

SIMON B. MINNICH, OF LANDISVILLE, PENNSYLVANIA.

COUNTERSINK-TOOL.

SPECIFICATION forming part of Letters Patent No. 532,472, dated January 15, 1895.

Application filed May 8, 1890. Serial No. 351,094. (No model.)

*To all whom it may concern:*

Be it known that I, SIMON B. MINNICH, a citizen of the United States, residing at Landisville, in the county of Lancaster and State of Pennsylvania, have invented certain new and useful Improvements in Countersink-Tools; and I do hereby declare the following to be a full, clear, and exact description of the invention, such as will enable others skilled in the art to which it appertains to make and use the same.

My invention relates to improvements in a countersink tool of that class in which a fluted drill, straight or twist has its center below the shank cut away forming an axial recess into which is fitted a similar fluted drill of a smaller size.

The object of my invention is the construction of a tool adapted to work in either metal or wood and that will be easily kept in order, first, in having a center bit that may be ground without detaching; second, by protecting the central points of the countersink cutting edges against being readily broken, and, third, by easily moving therefrom the center bit when the countersink cutter has to be sharpened.

While my tool will be convenient whenever it is desired to drill a hole having a countersunk opening, it is especially adapted to the centering of shafts, &c., preparatory to their being mounted on the center pins in the head and tail stocks of lathes, &c.

I attain the purposes of my invention by the devices illustrated in the accompanying drawings, in which—

Figure 1:
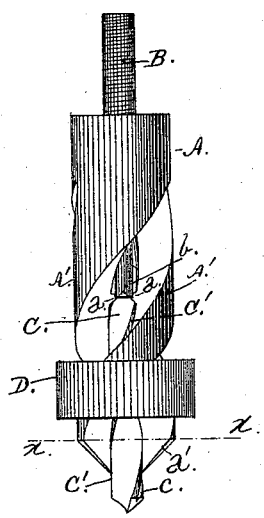
Figure 2:
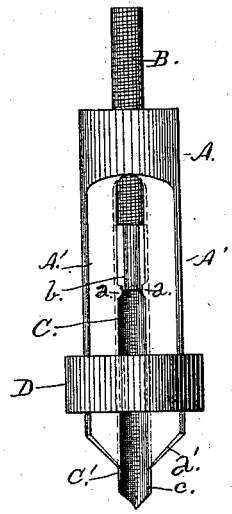
Figure 3:
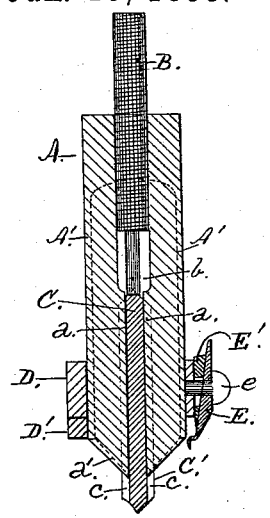
Figure 4:
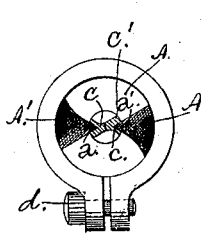
Figure 5:
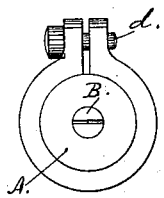
Figure 6:
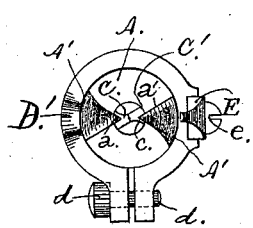
Figure 7:
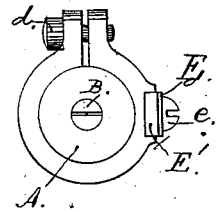
Figure 8:
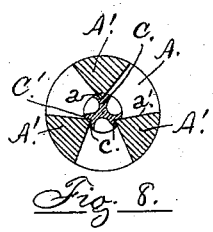

Figures 1 and 2 are elevations respectively of a fluted twist, and a fluted straight drill, each embodying the elements of my invention. Fig. 3 is a vertical section of Fig. 2, the clamp collar being provided with a plug hole cutter and a downwardly projecting stop lug; Fig. 4, an end view from below of the portion above the line *x x* in Fig. 1; Fig. 5, a top view of Fig. 1; Fig. 6, a lower end, and Fig. 7, a top view of Fig. 3, completed; and Fig. 8, a cross section of a tri-fluted drill with the clamp or gage collar removed.

A designates the body of a fluted drill having the center along the axis cut away to the shank leaving the inner edges *a* of the flute wings or walls A' angular or slightly rounded, and *a'* represents the countersink cutting edges having at their central end points in corresponding grooves in the sides of the flute walls of the center bit.

Threaded axially into the shank of the body A, is a screw B, the lower end *b* of which pressing on the upper end, or shank, of the center bit may be recessed upward to receive a point of the center bit, as shown. This screw is adapted to impinge upon the upper end of the center bit to prevent said bit from being pushed upward into the body A, and also, to push the bit down when it is desired to bore a deeper hole, or to remove it from the body A.

C represents the center bit, being a fluted drill similar in construction to the body A into which it is inserted. The outer faces of the flute wings or walls C' are provided with grooves *c* adapted to receive the edges *a* of the flute walls A', Figs. 3, 4 and 6; in which case, the central end points of the countersink cutting edges *a'* will lie within the body of the center bit and be protected from ready breakage.

D is a collar or clamp surrounding the flute walls A' of the body A and is held in place by a clamp screw *d*. This clamp screw serves to compress the walls A', keeping their edges *a* fixed in place in the grooves *c* of the center bit C as shown, and also acting as a stop to regulate the depth of the countersink.

The collar or clamp D may be provided with a plug hole cutter E recessed into a side of said collar, held in place by a screw *e* tapped into the body of the collar and laterally adjustable by means of a slotted wedge E' as shown in Fig. 3. The collar or clamp D may also be provided with a downwardly projecting lug D' to regulate the depth of the countersink when the plug hole cutter is used.

The screw B may be dispensed with when the clamp D is used; and the clamp D is not required when the body A is sufficiently heavy, but then the screw B must be used.

It will be readily observed that in the constructions illustrated and described, the flutes of the several drills are unobstructed and free for the passage of the cuttings from the hole in process of boring; that the center bit may be readily ground without detaching it from the body A; that the central end points of the countersink cutting edges being in the grooves in the flute walls of the center bit, are secured against ready breakage; that the center bit may be readily removed therefrom, when it is desired to sharpen the edges $a'$ of the countersink cutter; that both the body A and the center bit C may be ground and used as any ordinary fluted drill until the flute walls are consumed; and that a plug hole may be cut following the countersink whenever it is desired.

Having now described my invention and set forth its several points, I do not claim the countersink cutter broadly, but

What I do consider new, and desire to secure by Letters Patent of the United States, is—

The combination in a counter-sink tool, with the fluted drill A having the flute walls A' having the inner edges $a$, as described, and the counter-sink cutting edges $a'$ at the lower ends of said walls, of the fluted drill C having the flute walls C' and the grooves $c$ in the outer faces throughout the whole extent of said walls; the drill C, as described, placed within the drill A, as described, said edges $a$ within said grooves $c$, to protect the points of the cutting edges $a'$; and, means provided to bear on the upper end of the drill C, such as the axial screw B tapped through the shank of the drill A, substantially as described and for the purpose set forth.

In testimony whereof I affix my signature in presence of two witnesses.

SIMON B. MINNICH.

Witnesses:
J. L. LYTE,
H. REESE.